Patented May 23, 1950

2,508,652

UNITED STATES PATENT OFFICE 2,508,652

DI-N-SUBSTITUTED PIPERAZINE DERIVATIVES AND METHOD OF PREPARING SAME

John Ross, Ramsey, and John David Malkemus, Allendale, N. J., assignors to Colgate-Palmolive-Peet Company, Jersey City, N. J., a corporation of Delaware No Drawing. Application May 13, 1947, Serial No. 747,842

9 Claims. (Cl. 260—268)

This invention relates to a new class of compounds derived from heterocyclic nitrogen compounds of the type represented by piperazine and alkyl-substituted piperazines.

More particularly, the invention relates to a new class of compounds of the foregoing nature that are characterized by the presence in the molecule of (a) a long-chain aliphatic radical of from 6 to 24 carbon atoms, (b) one or more alkoxy groups, (c) the ring structure of the heterocyclic nitrogen compound piperazine, and (d) a short-chain aliphatic radical of from one to three carbon atoms. Still more particularly, the invention relates to a new class of compounds that are derivatives of piperazine or an alkyl-substituted piperazine, further characterized by the presence of two side-chain substituents at the hetero-nitrogen atoms, one such substituent including a long-chain aliphatic radical of from 6 to 24 carbon atoms and at least one alkoxy radical, such as ethoxy, and the other side-chain substituent consisting of a short-chain acyl or short-chain alkyl radical, the length of the short chain varying from one to three carbon atoms.

The invention further relates to a new class of compounds having excellent foaming, deterging, wetting and lime-soap-dispersing properties.

The invention also relates to processes for preparing compounds of the foregoing nature.

It is an object of the present invention to provide a new class of compounds having enhanced surface activity for many industrial uses where surface-active compounds are required.

It is a further object of the invention to provide a new class of compounds having surface-active properties characterized in that they are derivatives of a heterocyclic nitrogen compound of the class consisting of piperazine and alkyl-substituted piperazines in which one of the hetero-nitrogen atoms has attached thereto a side chain including at least one alkoxy radical, such as ethoxy, and a long-chain ($C_6$ to $C_{24}$) aliphatic radical, and in which compounds the remaining heteronitrogen atom of the piperazine nucleus has attached thereto a short-chain alkyl or a short-chain acyl radical, the length of the short chain varying from one to three carbon atoms.

The manner in which these and other objects of the invention are achieved will become apparent from the following description.

In accordance with the present invention it has been discovered that a new class of compounds useful as intermediates and as foaming, deterging, wetting and lime-soap-dispersing agents may be obtained by suitable syntheses to be described more fully hereinafter, employing as starting materials (1) either (a) a relatively high molecular weight fatty acid (R.COOH) having from 6 to 24 carbon atoms, and preferably a fatty acid having from 12 to 18 carbon atoms, the acid being saturated or unsaturated and with or without substituents such as hydroxyl, etc. or (b) a relatively high molecular weight aliphatic halide (R.X) having from 6 to 24 carbon atoms, and preferably having from 12 to 18 carbon atoms, the aliphatic portion being saturated or unsaturated and with or without substituents such as hydroxyl, etc.; (2) a convenient source of an alkoxy radical such as ethylene oxide, and (3) piperazine or an alkyl-substituted piperazine in which the alkyl substituents are preferably of not more than two carbon atoms.

The novel compounds that are obtained in accordance with the present invention in its broadest aspects fall in the class represented by the following general structural formula:

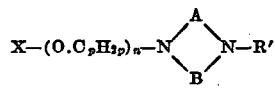

where X is selected from the class consisting of R and R.CO; A and B are selected from the class consisting of unsubstituted ethylene radicals and ethylene radicals having from one to four short-chain alkyl substituents of not more than two carbon atoms each; R is a long-chain aliphatic radical such that the carbon atom content of X varies from 6 to 24 carbon atoms, and preferably from 12 to 18 carbon atoms; R' is selected from the class consisting of short-chain alkyl and short-chain acyl radicals, the length of the short chain varying from one to three carbon atoms; $n$ is a small whole number varying from 1 to 9; and $p$ is a small whole number at least 2, and preferably varying from 2 to 4.

A preferred class of novel compounds within the general class set forth above is represented by those compounds containing ethoxy radicals in the side-chain substituent and having no alkyl substituents attached to any of the ring carbon atoms, and corresponding to the following general structural formula:

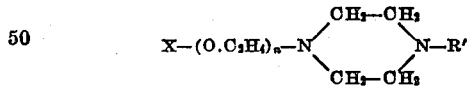

where the various letters have the same meanings as in the immediately preceding formula.

While the foregoing structural formulae aptly represent the general class of compounds with which in its broadest aspects the present invention is concerned, it may also be found convenient to consider the various new compounds that are comprehended within the scope of the present invention as falling within the following two sub-classes of compounds, corresponding respectively to ester and ether derivatives of piperazine or alkyl-substituted piperazine, respectively. For simplicity these formulae are confined to those compounds containing ethoxy (—O.C₂H₄—), it being understood however that alkoxy compounds broadly are contemplated:

Ia      R.CO(OC₂H₄)ₙN(C₂H₄)₂NR′
Ib        R(OC₂H₄)ₙN(C₂H₄)₂NR′

In each of the foregoing formulae R, R′ and $n$ have the same meanings as before, it being understood that R is a long-chain aliphatic radical such that the carbon content of the entire radical (i. e., R.CO— and R—, respectively) attached to the terminal ethoxy radical varies from 6 to 24 carbon atoms, and preferably from 12 to 18 carbon atoms.

It will be noted that Formula Ia represents a long-chain fatty acid ester derivative of piperazine wherein the acyl radical is separated from the heterocyclic nitrogen ring structure by at least one ethoxy radical, whereas Formula Ib represents a long-chain aliphatic ether derivative of piperazine in which the long-chain aliphatic radical is similarly separated from the heterocyclic nitrogen ring structure by at least one ethoxy radical.

Before discussing suitable methods of syntheses for the compounds disclosed, it may be well to point out at this stage of the description that the value of $n$ in the preceding formulae is preferably so chosen as to bring about a desired degree of hydrophilic and hydrophobic properties of the resulting molecule, depending upon the intended use for the given compound. In other words, it is readily possible so to adjust the value of $n$ that the resulting compound will show affinities toward both aqueous liquids and oily liquids. Under certain circumstances it may be desirable to produce a specific compound whose affinity for aqueous liquids materially exceeds its affinity for oily liquids, or conversely. For example, many ore flotation processes require flotation agents or assistants possessing definite properties as regards their respective affinities toward aqueous and oily components, depending for example upon factors such as the nature of the ore undergoing treatment and the particular ingredients thereof being recovered. Also in the treatment of textile materials, such factors as the nature of the textile fibres being treated as well as the presence of other ingredients of the treating composition may render it desirable to produce compounds in accordance with the present invention having desirable surface-active properties, as determined in part by the number of alkoxy radicals present in the side chain. Accordingly, the ability readily to produce compounds of desirable surface-active properties to fit the requirements of any particular use or class of uses is one of the outstanding features of the present invention.

In making the long-chain fatty acid ester derivatives of piperazine in accordance with the present invention, a wide variety of carboxylic acids or the corresponding acid halides may be employed as starting material. For example, suitable carboxylic acids include lauric acid, myristic acid, palmitic acid, stearic acid, hydroxystearic acid, oleic acid, ricinoleic acid, caprilic acid, iso-caprylic acid, caproic acid, undecylenic acid, linoleic acid, linolenic acid, erucic acid, mixed coconut oil fatty acids, mixed tallow fatty acids, mixtures of any of these acids, etc. Acid halides, particularly the acid chlorides of the foregoing, are also suitable. Similarly, lower alkyl esters of any of these acids (that is esters of alcohols having from one to about six carbon atoms, such esters including methyl, ethyl, propyl and isopropyl esters, etc.) may also be employed to form the desired long-chain ester derivatives by an alcoholysis reaction. Also the chlorides, bromides and iodides of the aliphatic compounds corresponding to these acids may be employed in order to provide the corresponding ethers of the present invention; to mention only a few of the suitable alkyl halides by way of example: dodecyl, tetradecyl, hexadecyl, octadecyl, hydroxyoctadecyl, Δ9-octadecenyl (corresponding to oleyl alcohol), Δ9,12-octadecadienyl (corresponding to linoleyl alcohol), Δ9,12,15-octadecatrienyl (corresponding to linolenyl alcohol), 12-hydroxy-Δ9-octadecenyl (corresponding to ricinoleyl alcohol), hexyl, isooctyl, etc.

The compounds according to the present invention may be prepared as follows, reference being made for the sake of simplicity to the preparation of derivatives of piperazine containing no substituents in the heterocyclic ring other than at the hetero-nitrogen atoms:

Piperazine is reacted with one molecular equivalent of ethylene oxide to yield monoethanol piperazine in accordance with the following reaction:

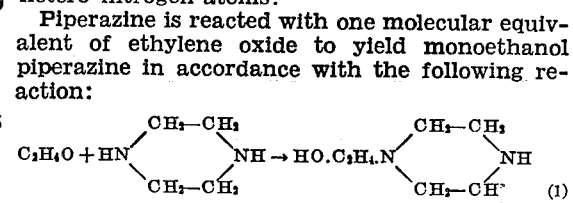
(1)

This compound may then be reacted with a short-chain alkyl halide having from 1 to 3 carbon atoms, e. g. methyl bromide, ethyl chloride, n-propyl iodide, etc. (R′Br), to give an N-alkyl-N′-ethanol-piperazine, in accordance with the following reaction:

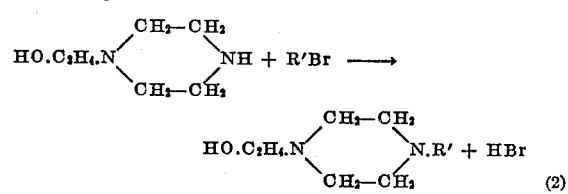
(2)

Besides resulting in the introduction of the desired short-chain alkyl substituent at the second hetero-nitrogen atom, it will be noted that another effect of Reaction 2 at this stage is to "protect" the hydrogen atom that is attached to the second hetero-nitrogen atom against undesired introduction of one or more ethoxy radicals during the course of building up the desired number of ethoxy radicals attached to the first hetero-nitrogen atom during the subsequent treatment of the mono-ethanol piperazine with further amounts of ethylene oxide, in cases where the side chain length is thus to be increased.

On the other hand, the hydrogen atom at the second hetero-nitrogen atom may also be protected by first treating the monoethanol piperazine with a short-chain acyl halide of from 1 to 3 carbon atoms, such as acetyl chloride, propionyl bromide, etc., to give an N-acyl-N′-ethanol-piperazine, for example N-acetyl-N′-ethanol-piperazine, which latter compound can thereafter be treated in the manner to be described without affecting the acyl (acetyl) substituent. As before, the step of protecting the hydrogen atom at the second hetero-nitrogen atom in the manner indicated serves also to introduce the desired short-chain acyl substituent into the molecule, in cases where in the final compound R' represents such a short-chain acyl radical.

In cases where $n$ of the general formulae set forth above is to have a value in excess of one, the N-alkyl-N'-ethanol-piperazine obtained from Reaction 2, or alternatively, the N-acyl-N'-ethanol-piperazine mentioned in the preceding paragraph, is then reacted with a further quantity of ethylene oxide at an elevated temperature in order to introduce a plurality of ethoxy radicals into the molecule. The reaction is preferably carried out at an elevated temperature such as the order of approximately 150° C. and under superatmospheric pressure, the particular superatmospheric pressure in any given instance being determined principally by factors such as the quantity of ethylene oxide in the system, the course of the reaction, the volume of the reaction system, and the particular temperature at which reaction takes place. Superatmospheric pressures autogenously induced in the reaction system are satisfactory. In accordance with the foregoing reaction additional ethoxy radicals are introduced into the molecule as shown by the following reaction:

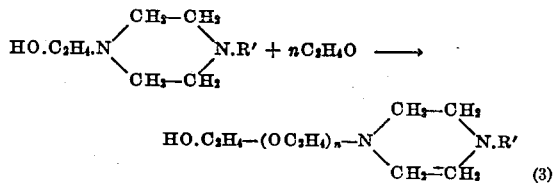

 (3)

It will be understood that the reaction product actually obtained contains minor amounts of the corresponding derivatives containing more and fewer ethoxy radicals respectively, the formula given however being representative of the statistical average.

The reaction product thus obtained is then reacted with a long-chain fatty acid, R.COOH, in order to produce a final ester product conforming structurally to Formula Ia above:

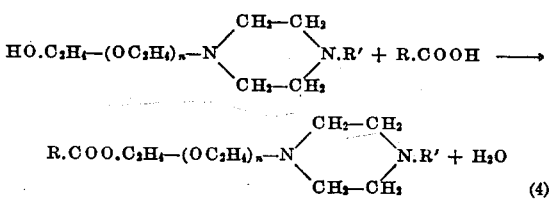

(4)

However, instead of carrying out the esterification by means of a long-chain fatty acid,

R.COOH as indicated above, one may employ at this point a lower alkyl ester of the desired long-chain fatty acid, R.COO.alk, in an alcoholysis type reaction in the presence of a small amount (varying from traces up to approximately 2% by weight of the combined reactants) of a caustic alkali, such as NaOH, the reaction proceeding as follows:

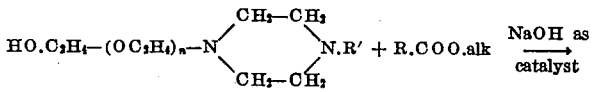

Furthermore, the esterification may if desired be effected with the use of a long-chain acid halide, R.CO.X in accordance with the following equation:

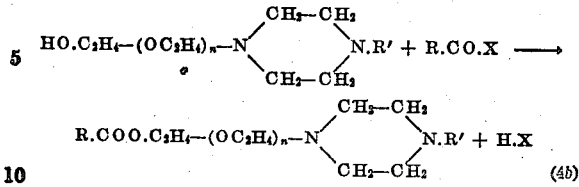

(4b)

Finally the long-chain acid anhydrides may be employed for esterification, thus:

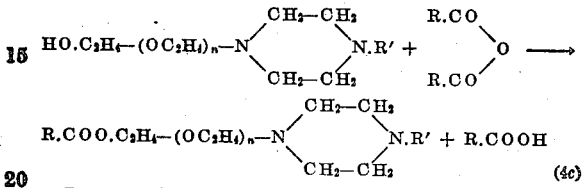

(4c)

In case it is desired to produce the corresponding ether derivative shown in Formula Ib instead of the ester derivative of Formula Ia, then the reaction product obtained from Reaction 3 having a terminal alcoholic OH group is reacted with an alkali metal such as sodium to produce the corresponding sodyl derivative as follows:

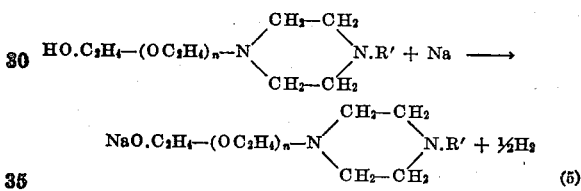

(5)

The reaction product thus obtained is then treated with a long-chain aliphatic halide, R.X, in order to produce the desired ether compound in accordance with the following reaction:

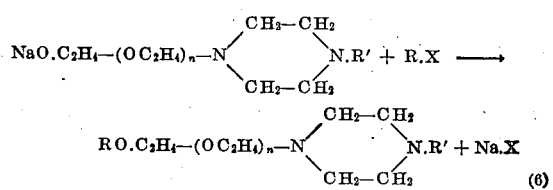

(6)

In general, it is ordinarily preferred to employ substantially stoichiometric ratios of the reactants as indicated by the foregoing equations. However considerable departure from these ratios can be tolerated in many instances without serious detriment to either yields or quality of product. In connection with the reaction illustrated above as Reaction 1, however, if one resorts to the use of other than substantially stoichiometric ratios of reactants it is ordinarily preferred to modify this ratio in the direction of providing an excess of piperazine or piperazine derivative, thereby decreasing the yield of undesired by-products such as diethanol piperazine. Similarly when conducting the reactions indicated above by Equations 4, 4a, 4b, 4c, 5 and 6, it is preferred to depart if at all from the use of substantially stoichiometric ratios of the reactants in the direction of insuring the presence of an excess of piperazine derivative in the reaction system. Thus ratios of about one to five mols of

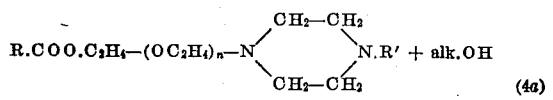

(4a)

piperazine or piperazine derivative for each mol of other reactant in accordance with each of Reactions 1, 4, 4a, 4b, 4c, 5 and 6 represent desirable procedure in most instances.

The long-chain aliphatic ester and ether derivatives prepared according to the present invention possess very desirable surface-active properties. They are valuable detergents and are also useful as wetting, foaming and lime-soap-dispersing agents. They may be used either alone or in combination with many other surface-active materials, such as soaps and/or other synthetic surface-active compounds of the type of sulphated and/or sulphonated organic compounds, especially when employed in a neutral or alkaline environment. In fact, certain of the compounds of the present invention, when employed in conjunction with anionic surface-active agents, especially in neutral or alkaline solutions, enhance considerably the detersive efficiencies of the latter, thus positively indicating the presence of synergistic action.

The novel compounds described herein exhibit desirable surface-active properties in both acid and alkaline media, although they appear to change in character from a cationic active form to an essentially non-ionized form, depending upon the pH of the environment in which they are employed.

The novel compounds contemplated as falling within the scope of the present invention may be made up in dilute or concentrated aqueous solution, with or without the presence of a substantial content of a low molecular weight alcohol such as ethyl alcohol. Adjuvant materials may be admixed with these compounds to form flakes, granular particles, cakes, pastes, or other physical forms of the mixture, or such adjuvant materials may be added to aqueous or other solutions of the compound. Such adjuvant materials may include sodium chloride, sodium sulphate, sodium pyrophosphate, as well as other builders and/or fillers employed in the soap and synthetic detergent arts generally, care being taken to avoid the use of any additives which would substantially diminish the effectiveness of the resulting composition. Those skilled in the art will of course appreciate that the type of addition agent to be employed depends at least in part upon the ultimate use to which the product is to be put.

The properties of the specific compounds of the present invention vary to some degree, depending upon the particular starting materials from which they are prepared, but all are surface-active agents having valuable wetting, deterging, emulsifying, softening, foaming and lime-soap-dispersing properties. They are suitable for use as assistants in the textile and related industries where they may be employed for softening fabrics, fixing colors, removing grease and oil, penetrating, etc. They are also of use in the ore flotation art as addition agents to the ore treating baths employed for separating various constituents of ores. They are also of value in the cosmetic industry as emulsifying agents and for stabilizing emulsions.

In order to indicate even more fully the nature of the present invention, the following examples of typical procedure are set forth, it being understood that these examples are presented as illustrative only and that they are not intended to limit the scope of the invention. The parts given are parts by weight unless otherwise indicated.

Example Ia

A solution of piperazine and alcohol is prepared containing 344 parts of anhydrous piperazine in 500 parts of methyl alcohol and the solution is heated to boiling in a vessel fitted with a reflux condenser. Ethylene oxide gas is passed into the mixture under reflux until 156 parts have been absorbed. The resulting reaction mixture is then distilled under substantially atmospheric pressure, and then under reduced pressure while slowly passing a stream of an inert gas, such as nitrogen, through the apparatus. About 220 parts of monoethanol piperazine (a viscous oil, $n_D^{25}$ 1.5050) are collected at 125°–127° C. at an absolute pressure of 12 mm. of mercury.

130 parts of this product are treated with a substantially equimolar proportion of ethyl bromide in ethyl alcohol, the solution being heated to a temperature of about 75° to 100° C. for ten hours under autogenous pressure. At the end of this time the solvent is removed by distillation. The residue is then treated with 10% sodium hydroxide solution after which the mixture is saturated by the addition of solid potassium carbonate, followed by extraction with ether. Evaporation of the ether solution (after drying over solid potassium carbonate) leaves a residue, N-β-hydroxyethyl-N'-ethyl-piperazine, a viscous oil. This product is then treated with ethylene oxide at an elevated temperature of the order of about 150° C. under autogenous pressure and in the presence of a trace (about 0.01–0.1%) of alkaline catalyst, such as NaOH or NaOCH₃, until two mols of ethylene oxide per mol of the hydroxy amine have reacted. The resulting product consists principally of N-ethoxy-ethoxy-ethanol-N'-ethyl-piperazine

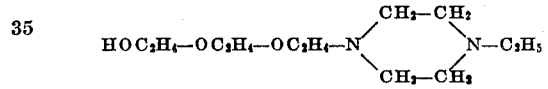

250 parts of the above compound are esterified with 200 parts (substantially an equimolar proportion) of lauric acid by heating the reaction mixture at 180° to 200° C. in the presence of an inert gas such as nitrogen until esterification is substantially complete. The reaction mixture is finally heated under diminished pressure in order to remove the last traces of water from the system. This procedure results in the formation of the laurate ester of N-ethoxy-ethoxy-ethanol-N'-ethyl-piperazine having the structure:

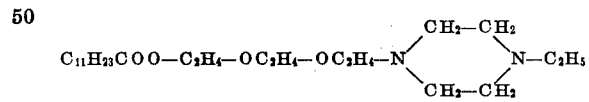

Example Ib

In preparing the ether derivative corresponding to Formula Ib above, instead of reacting the N-ethoxy-ethoxy-ethanol-N'-ethyl-piperazine derivative, obtained as indicated above in Example Ia, with a fatty acid such as lauric acid, 135 parts of the aforesaid piperazine derivative are instead treated in anhydrous dioxane with approximately 11.5 parts of metallic sodium while heating under reflux conditions to give the corresponding sodium derivative. This sodium derivative is then reacted with 116 parts of tetradecyl chloride to give the corresponding tetradecyl polyether derivative of piperazine having the formula:

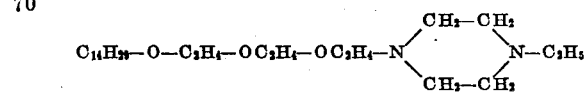

In order to show typical ways in which compounds of the foregoing type may be employed the following examples are set forth:

Example A

Two parts of the lauric acid ester derivative of piperazine, obtained according to the procedure of Example Ia above, are dispersed in 198 parts of water to give a 1% aqueous dispersion of the product. 1 cc. of this dispersion, when added to 10 cc. of water, gives a turbid solution which foams well on agitation, and portions thereof when added to acid and to alkaline solutions, followed by adjusting the solutions to pH's of 4.0 and 9.0 respectively, result in the production of dilute aqueous solutions which give generous quantities of foam, and which show good detersive efficiencies, when used in water having about 250 parts per million of hardness calculated as calcium carbonate. The pH 4.0 solution was clear while the pH 9.0 solution was turbid; both solutions reduced the surface tension of water markedly.

Example B

One part of the tetradecyl polyether derivative of piperazine, obtained as in Example Ib above, is dispersed in 99 parts of water to give a 1% aqueous dispersion. 1 cc. of this dispersion, when added to 10 cc. of water, gives a somewhat turbid solution which readily foams on agitation. Portions of the turbid solution, when added to acid and to alkaline solutions, followed by adjusting the pH's thereof to 4.5 and 8.5 respectively, yield dilute aqueous solutions which foam well and display good detersive efficiencies when used in water having about 250 parts per million of hardness calculated as calcium carbonate.

Further examples of preparation of compounds according to the present invention are set forth below, for the purpose of giving an even more complete understanding of the invention.

Example II

A solution of 130 parts of N-ethanolpiperazine and 95 parts of methyl bromide in 200 parts of methyl alcohol is heated in a pressure bottle in a steam bath for about six hours. Then, after removing the solvent by distillation, the residue is partitioned between 10% sodium hydroxide solution and ether. The dried ether solution is then distilled leaving as residue a light yellow oil, N-β-hydroxyethyl-N'-methylpiperazine,

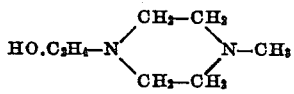

144 parts of this product are heated with 200 parts of the methyl esters of coconut fatty acid (the average composition of which may be indicated by the formula $C_{11}H_{23}COO.CH_3$) at about 160° C. in the presence of 1 part NaOH under an atmosphere of nitrogen, and finally under diminished pressure to remove the last traces of methyl alcohol. The residue consists principally of the coconut fatty acid esters of N-β-hydroxyethyl-N'-methylpiperazine,

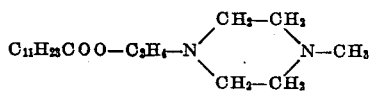

One part of this product, which is a viscous light brown oil, is dispersed in 99 parts of water to form a turbid mixture which exhibits only slight foaming and detersive properties at pH 9.0. However, when this dispersion is acidified with dilute hydrochloric acid the resulting solution possesses good foaming, wetting, emulsifying and derging properties.

Example III

To a solution of 86 parts of anhydrous piperazine and 500 parts of glacial acetic acid are added 100 parts of acetic anhydride at 40°-50° C. with stirring, and the reaction mixture is stirred at this temperature for two hours. After addition of 100 parts of concentrated hydrochloric acid the solution is evaporated and the viscous sirup extracted with hot benzene. The residue from this extraction is then treated with absolute ethyl alcohol followed by filtration. Evaporation of the filtrate to small volume, followed by treatment with 10% sodium hydroxide solution and extraction with ether, effectively separates the desired monoacetyl derivative from unreacted piperazine and the diacetyl derivative. The yellow-red viscous residue resulting from evaporation of the ether solution consists largely of N-acetyl-piperazine,

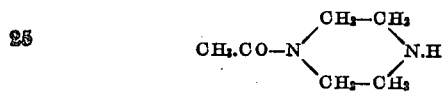

Ethylene oxide gas is passed into a refluxing solution of 64 parts of N-acetyl-piperazine in 150 parts of methyl alcohol until 22 parts are absorbed as shown by the increase in weight. Removal of the solvent by distillation leaves a hygroscopic red viscous liquid as residue which contains a large proportion of N-acetyl-N'-β-hydroxyethyl-piperazine,

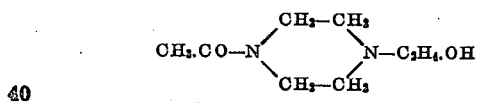

To a solution of 85 parts of N-acetyl-N'-β-hydroxyethyl-piperazine in anhydrous dioxane are added 11 parts of sodium wire with stirring and the mixture is refluxed for about three hours. Then 120 parts of dodecyl bromide are slowly added to the stirred refluxing mixture over a period of two hours. After heating for an additional two hours the solvent is removed by distillation under reduced pressure, leaving principally as residue the dodecyl ether of N-acetyl-N'-β-hydroxyethyl-piperazine,

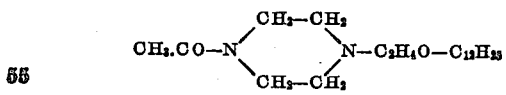

One part of the above reaction product, when dispersed in 99 parts of water gives a turbid dispersion which foams only slightly. On acidifying with dilute hydrochloric acid, however, the solution is almost clear and foams well when shaken and possesses good wetting and other surface-active properties.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure and compounds set forth above are intended to be illustrative only and are not intended to limit the scope of the invention.

What is claimed is:

1. A piperazine derivative having the following structural formula:

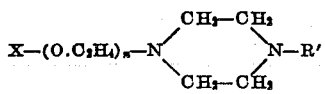

where X is selected from the class consisting of R and R.CO; R is a long-chain aliphatic radical such that the carbon atom content of X varies from 6 to 24 carbon atoms; R' is selected from the class consisting of short-chain alkyl and short-chain acyl radicals; and $n$ is a small whole number varying from 1 to 9.

2. A piperazine derivative having the following structural formula:

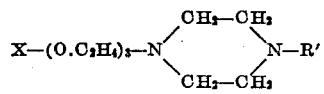

where X is selected from the class consisting of R and R.CO; R is a long-chain aliphatic radical such that the carbon atom content of X varies from 6 to 24 carbon atoms; and R' is selected from the class consisting of short-chain alkyl and short-chain acyl radicals.

3. A process for preparing surface-active compounds which comprises reacting (a) a compound having the following structural formula:

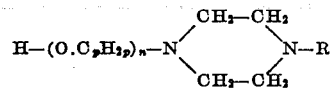

where R' is selected from the class consisting of short-chain alkyl and short-chain acyl radicals; $n$ is a small whole number varying from 1 to 9; and $p$ is a small whole number varying from 2 to 4, with (b) a member of the class consisting of carboxylic acids, their lower alkyl esters, their anhydrides and their acid halides, wherein the carboxylic acid radical has from 6 to 24 carbon atoms, and recovering the resulting high molecular weight ester.

4. A process for preparing surface-active compounds which comprises reacting (a) a compound having the following structural formula:

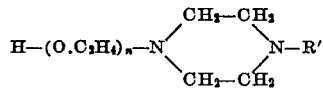

where R' is selected from the class consisting of short-chain alkyl and short-chain acyl radicals, the length of the short chain varying from 1 to 3 carbon atoms; and $n$ is a small whole number varying from 1 to 9, with (b) a member of the class consisting of carboxylic acids, their lower alkyl esters, their anhydrides and their acid halides, wherein the carboxylic acid radical has from 6 to 24 carbon atoms, and recovering the resulting high molecular weight ester.

5. A process for preparing surface-active compounds which comprises reacting (a) a compound having the following structural formula:

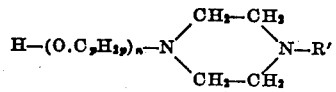

where R' is selected from the class consisting of short-chain alkyl and short-chain acyl radicals; $n$ is a small whole number varying from 1 to 9; and $p$ is a small whole number varying from 2 to 4, with (b) free alkali metal for forming an alkoxide, and thereafter reacting the alkoxide with an alkyl halide having from 6 to 24 carbon atoms, and recovering the resulting high molecular weight ether.

6. A process for preparing surface-active compounds which comprises reacting (a) a compound having the following structural formula:

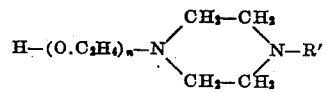

where R' is selected from the class consisting of short-chain alkyl and short-chain acyl radicals, the length of the short chain varying from 1 to 3 carbon atoms; and $n$ is a small whole number varying from 1 to 9, with (b) free alkali metal to form an alkoxide, and thereafter reacting the alkoxide with an alkyl halide from 6 to 24 carbon atoms, and recovering the resulting high molecular weight ether.

7. A piperazine derivative as defined in claim 3 wherein the carbon atom content of X is 18.

8. A piperazine derivative as defined in claim 3 wherein the carbon atom content of X is 16.

9. A piperazine derivative as defined in claim 3 wherein the carbon atom content of X is 12.

JOHN ROSS.
JOHN DAVID MALKEMUS.

REFERENCES CITED

The following references are of record in the file of this patent:

UNITED STATES PATENTS

| Number | Name | Date |
|---|---|---|
| 2,302,388 | Hester | Nov. 7, 1942 |
| 2,421,707 | Malkemus | June 3, 1947 |

OTHER REFERENCES

Jacobi-Berichte, 66, 113–115 (1933).

Kitchen et al., Jour. Org. Chem., 8 338–341 (1942).